2 Sheets—Sheet 1

J. ASHCROFT,

Assignor to S. J. ASHCROFT.

Steam Cooking-Range.

No. 9,004. Reissued Dec. 30, 1879.

Attest:
E. B. Barnum
A. Hopkins

Inventor:
John Ashcroft

2 Sheets—Sheet 2.

J. ASHCROFT,

Assignor to S. J. ASHCROFT.

Steam Cooking-Range.

No. 9,004. Reissued Dec. 30, 1879.

Attest:
E. B. Barnum
A. Hopkins

Inventor:
John Ashcroft

UNITED STATES PATENT OFFICE.

JOHN ASHCROFT, OF BROOKLYN, NEW YORK, ASSIGNOR TO SARAH JANE ASHCROFT.

IMPROVEMENT IN STEAM COOKING-RANGES.

Specification forming part of Letters Patent No. 113,241, dated April 4, 1871; Reissue No. 9,004, dated December 30, 1879; application filed November 11, 1879.

*To all whom it may concern:*

Be it known that I, JOHN ASHCROFT, of Brooklyn, county of Kings, in the State of New York, have invented certain new and useful Improvements in Steam Cooking-Ranges, of which the following is a specification, reference being had to the accompanying drawings, in which—

Figure 1:
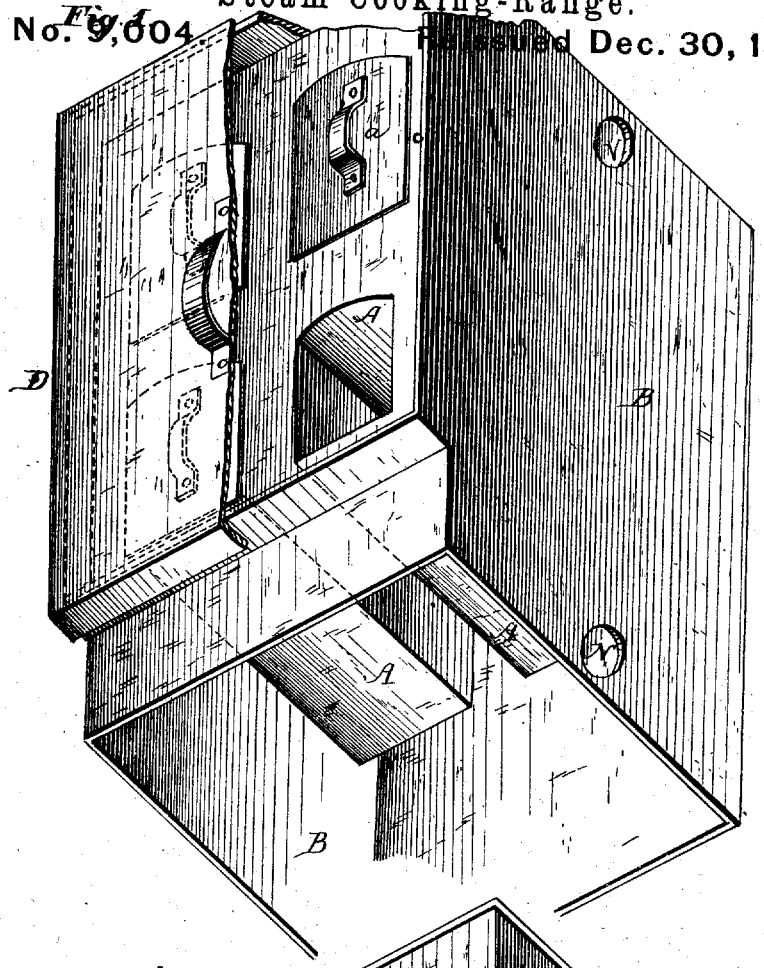
Figure 2:
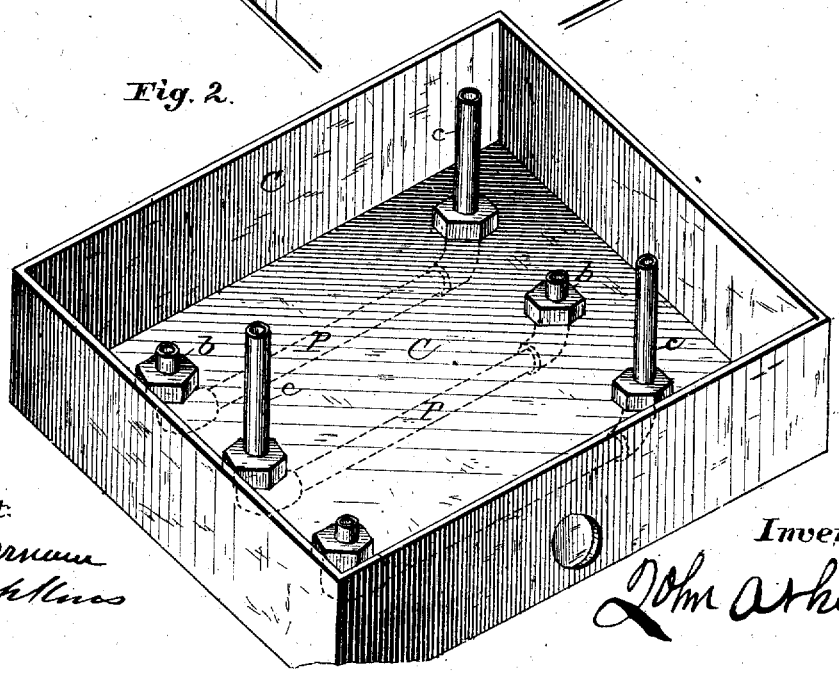
Figure 3:
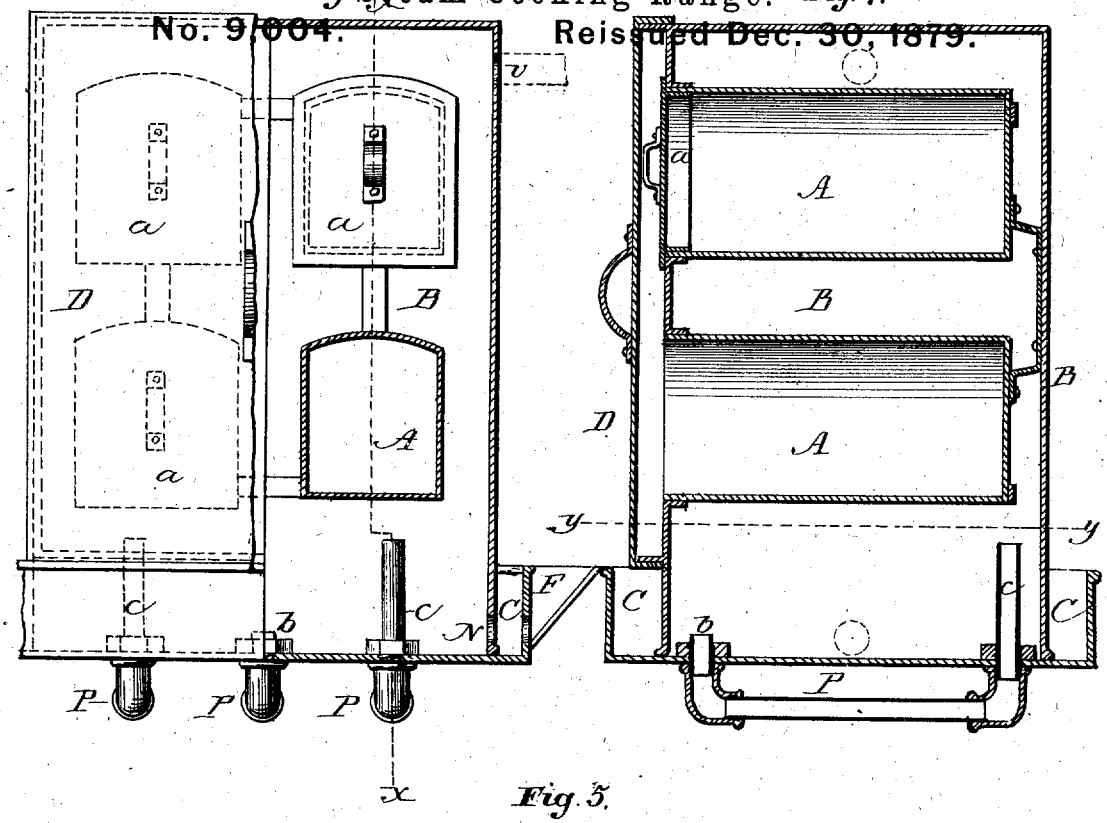
Figure 5:
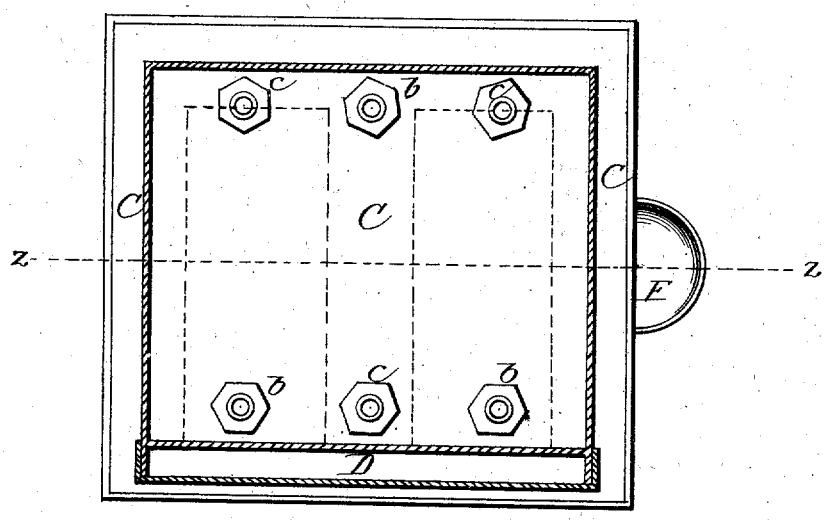

Figure 1 is a perspective view of the range; Fig. 2, of the generator. Fig. 3 is a front view, half in section, on the line *z z*. Fig. 4 is a vertical longitudinal section on line *x x*; and Fig. 5 is a bottom view, in section, on line *y y*.

The nature of my invention consists, first, in the peculiar construction and arrangement of ovens, to be hereinafter more fully described, whereby any one can be opened without interfering with or retarding the cooking in the others; and, second, in the arrangement and use of the steam-generating pipes, which are straight and provided with the necessary elbows.

A represents one or more ovens, secured in an outer shell or jacket, B, which forms the steam-chamber, these ovens being exposed to steam on all sides save their front or open ends, which are fitted with covers *a*, and this end of the chamber B is further protected, so as to economize the heat, by a cover, D, which serves to prevent radiation and the escape of the flavors of the articles cooking in the several ovens.

I prefer making my ovens rounding on the top, to prevent the condensed steam from lodging there and retard the cooking operations as it runs off and falls into the generator below.

By having my ovens arranged as they are, in using them, putting in food or removing it, the cook is not exposed to the steam, and the flavors of the same are preserved, there being no evaporation or atmospheric action. By this arrangement, when operating with one oven the cooking in the others is not retarded, as is generally the case in any other steam cooking apparatus.

C represents the steam-generator, in which a sufficient quantity of water is put, and the supply can be furnished through a funnel, F. P represents several pipes passing through and extending under the bottom of the generator, and which pipes are exposed to the fire.

The water passes into the ends *b*, and the steam passes out of the other ends, *c*.

This arrangement of pipes possesses a great advantage over the usual coil, which is objectionable for several obvious reasons, and well known to those using them, such as liability to clog up, and when hot the water will not circulate as well in them, &c.

At V, or near the top of my steam-chamber, I propose having a safety-valve; and at this opening I attach a pipe, as seen in dotted lines, Fig. 3, by which to carry off surplus steam and prevent it from forcing the water out of the generator.

When using my range where a supply of steam is available as on steamboats and in hotels, the steam-generator can be dispensed with, and a supply furnished by a connection with hole N, using the direct steam from a steam-boiler, in which case there should be a bottom to the range.

My chamber B may be surrounded by any desirable non-conducting material, so as to prevent radiation; or by putting a jacket around it a large amount of heat can be saved.

Having thus described my invention, what I claim as new, and desire to secure by Letters Patent of the United States, is—

1. A steam cooking-range consisting of the outer jacket, B, ovens A, lids *a* and D, constructed and arranged substantially as shown and described.

2. The steam-generator C, having the straight elbowed pipes P, constructed and arranged substantially as shown and described.

3. The combination of the jacket B, its ovens and lids, with the generator C and its pipes P, arranged and operated substantially as shown and described.

4. A steam cooking-range consisting of the outer jacket, B, having aperture N, ovens A, and lids *a*, constructed and arranged so that steam-connections may be made with an ordinary steam-boiler, and in combination therewith, substantially as described, whereby the special steam-generator may be dispensed with.

5. A steam cooking-range consisting of the outer jacket, B, ovens A, lids *a*, and aperture by means of which connections may be made with an independent steam-boiler, and in combination therewith, substantially as described.

JOHN ASHCROFT.

Witnesses:
E. B. BARNUM,
A. HOPKINS.